United States Patent [19]

Davis

[11] 4,131,769
[45] Dec. 26, 1978

[54] TELEPHONE LOCK

[76] Inventor: Sylvia Davis, 2100 First Ave., New York, N.Y. 10029

[21] Appl. No.: 829,629

[22] Filed: Sep. 1, 1977

[51] Int. Cl.² .............................................. H04M 1/66
[52] U.S. Cl. .................................. 179/189 D; 70/163; 292/38
[58] Field of Search ............... 179/189 D, 189 R, 179; 70/158, 163, 165, 167, 169, 170, 171, 172, 173, DIG. 34, 259; 292/38, 171

[56] References Cited

U.S. PATENT DOCUMENTS

| | | | |
|---|---|---|---|
| 2,118,606 | 5/1938 | Jandus et al. | 70/259 X |
| 2,154,118 | 4/1939 | Ames | 70/163 X |
| 2,885,931 | 5/1959 | McDonald et al. | 70/163 |
| 3,372,246 | 3/1968 | Kuepfer | 179/179 |
| 3,899,647 | 8/1975 | Nachsi et al. | 179/189 D |
| 4,028,508 | 6/1977 | Hall | 179/189 D |

Primary Examiner—Thomas W. Brown
Attorney, Agent, or Firm—Howard C. Miskin

[57] ABSTRACT

A telephone lock for use in conjunction with Trimline or similar telephones to preclude access to the dialing mechanism thereof thereby preventing unauthorized calls. The lock includes a housing adapted to cover the dialing mechanism of the phone, a plurality of spring urged engaging elements which are selectively extensive through spots located in the housing, and lock means disposed within the housing for extending and retracting the plurality of spring urged engaging elements.

4 Claims, 4 Drawing Figures

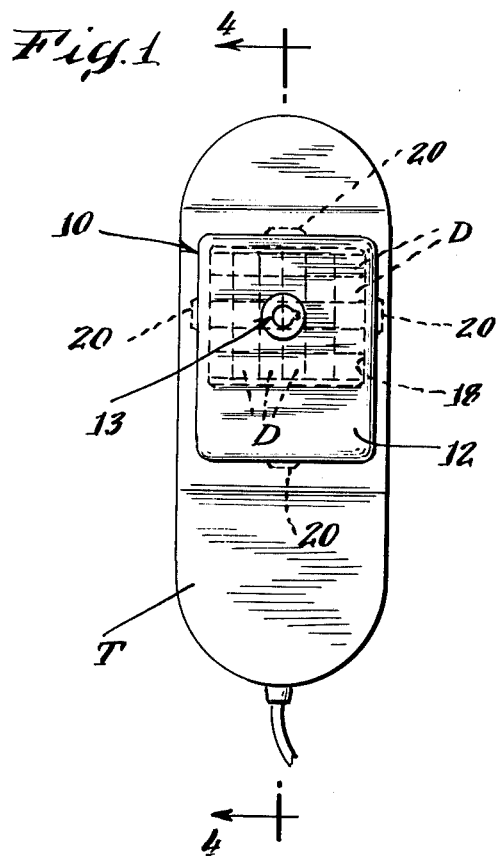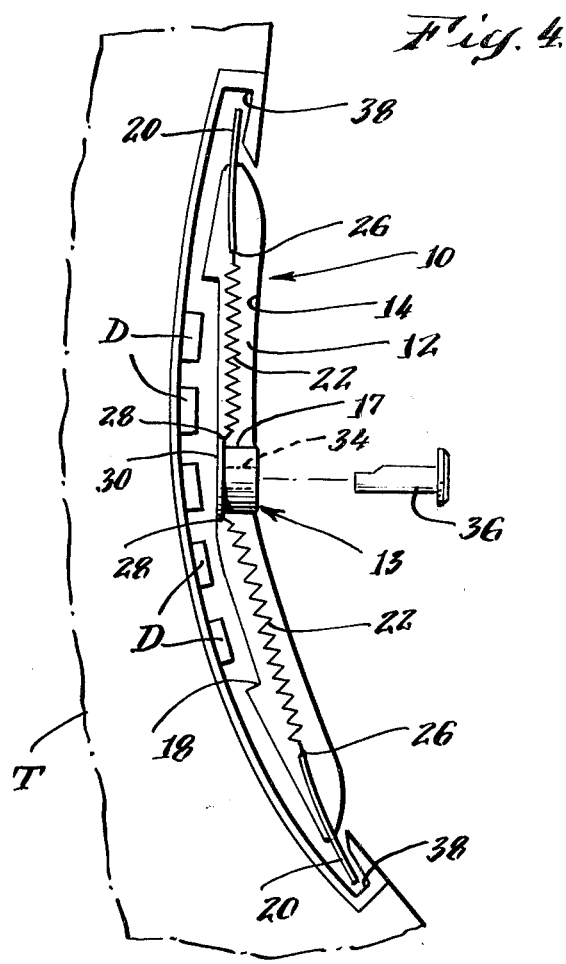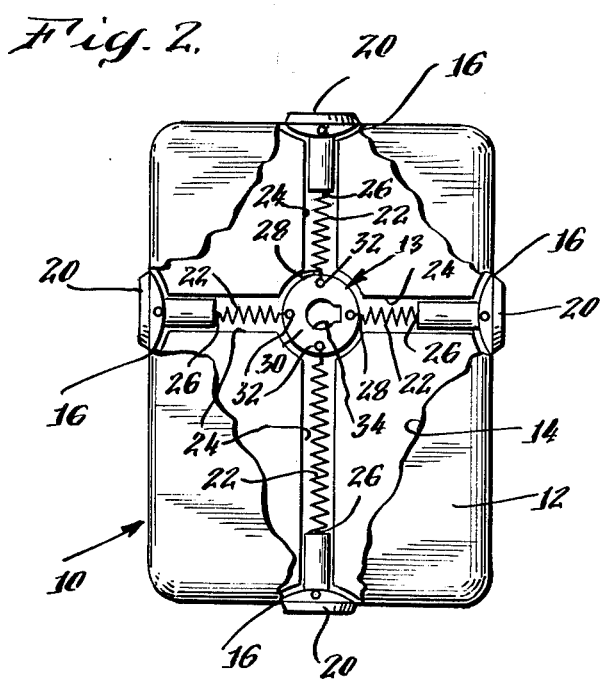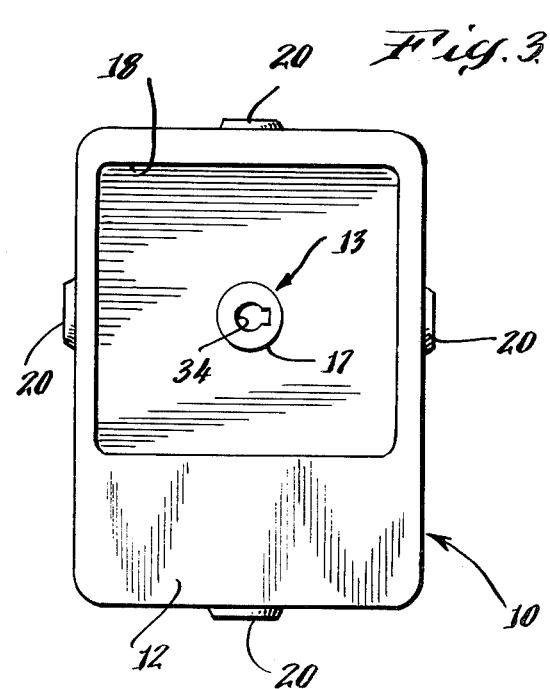

TELEPHONE LOCK

BACKGROUND OF THE INVENTION

1. Field of the Invention

The present invention relates to locking apparatuses for telephones, and more particularly, to a telephone lock for use with Trimline telephones or the like.

2. Description of the Prior Art

Locks which are used to disable the dialing function of dial-type telephone apparatuses are well known in the art. Locks which may be placed on the receiver cradle of the telephone to entirely disable the telephone are also well known in the art. However, neither of these devices may be employed to disable the use of an electronic dialing pad such as a Touch Tone pad or the like.

The present invention overcomes the problems associated with the prior art by providing a telephone lock which can be used to disable a Touch Tone pad or the like while permitting the use of the telephone for receiving calls.

SUMMARY OF THE INVENTION

Therefore, a primary object of the present invention is to provide a telephone lock for use in conjunction with a telephone having an electronic type dialing apparatus.

A further object of the present invention is to provide a telephone lock for use in conjunction with a telephone apparatus wherein the dialing apparatus thereof is surrounded on the perimeter thereof by a notch.

A still further object of the present invention is to provide a telephone lock which will disable the dialing mechanism of the telephone yet permit incoming calls to be received.

Still another object of the present invention is to provide a telephone lock which is ideally suited for use with Trimline telephones.

Still another further object of the present invention is to provide a telephone lock which is simple in design, inexpensive to manufacture, and durable.

These objects, as well as further objects and advantages, of the present invention will become readily apparent after reading the description of a non-limiting illustrative embodiment and the accompanying drawing.

A telephone lock for use in conjunction with a telephone having a dialing apparatus surrounded on the perimeter thereof by a notch according to the principles of the present invention includes a housing adapted to cover the dialing apparatus which forms a chamber therein, the housing having a plurality of slots disposed in the edges thereof and a central aperture disposed therethrough; a plurality of spring urged engaging elements disposed within the chamber and selectively extensive through the slots, the engaging elements adapted to engage the notch surrounding the dialing apparatus when in an extended position, the engaging elements for disengaging the notch when in a retracted position; and lock means disposed within the central aperture, the lock means for urging the engaging elements into a retracted position when acted upon by the user.

BRIEF DESCRIPTION OF THE DRAWING

In order that the present invention may be more fully understood it will now be described, by way of example, with reference to the accompanying drawing in which:

FIG. 1 is a front view of the preferred embodiment incorporating the principles of the present invention therein installed on a Trimline telephone;

FIG. 2 is a rear view of the preferred embodiment partially broken away to show the chamber thereof;

FIG. 3 is a front plan view of the preferred embodiment; and

FIG. 4 is a cross-sectional view of the preferred embodiment taken substantially along lines 4—4 of FIG. 1.

DESCRIPTION OF THE PREFERRED EMBODIMENT

Referring now to the figures, wherein like numerals indicate like elements throughout the several views, there is illustrated therein a telephone lock 10 mounted on a Trimline type telephone handset T which is provided with a dialing pad D. The telephone lock 10 includes a housing 12 which forms a chamber 14 therein. A plurality of slots 16 are disposed around the sidewalls of the housing 12 and a central aperture 17 is located therethrough.

The housing 12 provides a recess 18 to accommodate the placement thereof over the dialing pad D. A plurality of spring urged engaging elements 20 are slideably disposed through the slots 16. Each of the engaging elements 20 is urged by a helical coil spring 22 which is disposed in a plurality of tubular guides positioned within the chamber 14 of the housing 12. The tubular guides 24 are preferably integrally formed with the housing 14 and permit the engaging elements 20 to be directed through the slots 16. The ends 26 of the springs 22 are fixedly secured to the engaging elements 20. The ends 28 of each of the springs 22 are fixedly secured to eccentric points in a rotatable member or cam 30 rotatably disposed within the central aperture 17 provided by the housing 12. The ends 28 of the springs 22 are fixedly secured to the cam 30 by a rivet 32 or the like. A keyhole 34 is disposed through the cam 30. A key 36, corresponding in shape to the keyhole 34, is provided for insertion therein.

In use, the housing 12 is positioned over a dialing apparatus D of a telephone which is surrounded by a groove or notch 38 as most clearly illustrated in FIG. 4. The key 36 is inserted in the keyhole 34 and is turned so that the cam 30 rotates and retracts the springs 22 within the tubular guides 24. Resultantly, the engaging elements 20 are retracted through the slots 16 into the chamber 14. When the key 36 is released, the engaging elements 20 are extended through the slots 16 so that they may engage the groove or notch 38 thereby positioning the housing 12 over the dialing apparatus D. As a result, no phone calls may be dialed on the telephone T, but calls may be received. It should be apparent to one skilled in the art that a differently configured cam 30 or similar lock assembly may be employed without departing from the scope of the present invention.

The telephone lock 10 is preferably constructed of high impact plastic or the like with the springs 22 and engaging elements 20 being constructed of steel. It should also be noted that the telephone lock 10 may be used with telephones other than the Trimline type and telephones having other than electronic dialing apparatuses as long as the dialing apparatuses are surrounded with a groove or notch that can be engaged by the engaging elements 20 of the present invention.

Therefore, a primary advantage of the present invention is to provide a telephone lock for use in conjunction with a telephone having an electronic type dialing apparatus.

A further advantage of the present invention is to provide a telephone lock for use in conjunction with a telephone apparatus wherein the dialing apparatus thereof is surrounded on the perimeter thereof by a notch.

A still further advantage of the present invention is to provide a telephone lock which will disable the locking mechanism of the telephone yet permit incoming calls to be received.

Still another advantage of the present invention is to provide a telephone lock which is ideally suited for use with Trimline telephones.

Still another further advantage of the present invention is to provide a telephone lock which is simple in design, inexpensive to manufacture, and durable.

It will be understood that various changes in the details, materials, arrangements of parts and operation conditions which have been herein described and illustrated in order to explain the nature of the invention may be made by those skilled in the art within the principles and scope of the invention.

Having thus set forth the nature of the invention, what is claimed is:

1. In combination with a telephone having a dialing apparatus surrounded on the perimeter thereof by a notch delineating a window, a telephone lock comprising:

a housing adapted to cover said dailing apparatus and forming a chamber therein, said housing separably registering with said window and having a plurality of slots disposed in the edges thereof and a central aperture disposed therethrough;

a plurality of engaging elements disposed within said chamber and selectively extendable and retractable through said slots and spring urged to extended positions, said engaging elements when in an extended position engaging said slot and when in a retracted position, disengaging said notch and lock means disposed within said central aperture for urging said engaging elements into said retracted position when operated by a key.

2. A telephone lock in accordance with claim 1, wherein said engaging elements are urged by a plurality of helical compression springs, and a plurality of guides within said housing, said springs being positioned and guided by said guides.

3. A telephone lock in accordance with claim 2, wherein said lock means comprises a rotatable member rotatably disposed within said central aperture, said springs being fixedly secured on one end thereof eccentrically to said rotatable member, the other end of said springs being fixedly secured to said engaging elements, the rotation of said rotatable member retracting said springs and therefore said engaging elements, said rotatable member having a keyhole disposed therethrough, and a key for insertion in and cooperation with said keyhole.

4. A telephone lock in accordance with claim 1, wherein said housing provides a recess therein for receiving therein said dialing apparatus.

* * * * *